United States Patent [19]

Moffatt

[11] Patent Number: 5,049,528

[45] Date of Patent: Sep. 17, 1991

[54] CERAMIC COMPOSITE PRODUCTION BY PRECIPITATION OF POLYMER SOLUTION

[75] Inventor: William C. Moffatt, Cambridge, Mass.

[73] Assignee: Massachusetts Institute of Technology, Cambridge, Mass.

[21] Appl. No.: 288,976

[22] Filed: Dec. 23, 1988

Related U.S. Application Data

[63] Continuation of Ser. No. 208, Dec. 30, 1986, abandoned.

[51] Int. Cl.⁵ .............................................. C04B 35/02
[52] U.S. Cl. .......................................... 501/94; 501/1; 501/12; 501/88; 524/413; 524/435
[58] Field of Search ............................. 501/1, 88, 103; 524/413, 435; 427/220, 221

[56] References Cited

U.S. PATENT DOCUMENTS 3,897,586  7/1975  Coker .
3,932,594  1/1976  Gortsema .
3,969,547  7/1976  Isawa et al. .
4,010,242  3/1977  Iler et al. .
4,061,582  12/1977  Moschovis et al. .
4,518,737  5/1985  Traut ................................. 524/413

OTHER PUBLICATIONS

Moffatt, "Process and Properties of Alumina–Zirconia Composite Ceramics", submitted to Dept. of Materials Science & Engineering on May 1, 1987.

Primary Examiner—William R. Dixon, Jr.
Assistant Examiner—Alan A. Wright
Attorney, Agent, or Firm—Kilpatrick & Cody

[57] ABSTRACT

A method for forming extremely homogeneous metal and ceramic composites wherein a dispersion of metal and/or ceramic powders in a polymer solution, such as a solution of an organic binder, is precipitated by the addition of a second, miscible solvent in which the polymer is insoluble. The resulting precipitated second phase is compacted, dried and processed to form an extremely uniform composite with excellent physical properties. The method has advantages over other processes since it is relatively flexible and inexpensive yet yields a high quality product.

16 Claims, 2 Drawing Sheets

5,049,528

CERAMIC COMPOSITE PRODUCTION BY PRECIPITATION OF POLYMER SOLUTION

BACKGROUND OF THE INVENTION

The United States government has certain rights in this invention by virtue of Air Force Office of Scientific Research Contract #F49620 84 C 0097.

This is a continuation of U.S. Ser. No. 000,208 filed Dec. 30, 1986, now abandoned, by William C. Moffatt.

This invention is generally in the field of ceramic and metal compositions, particularly in the area of liquid processes for making uniform composites.

Ceramic composites are generally made by mixing the appropriate powders and then processing by compacting and sintering. In one common method, the ceramic powders are suspended in aqueous solution and mixed by tumbling with ceramic milling media. Other compounds such as binders or metallic powders are sometimes mixed in with the ceramic powders.

It is difficult to produce exceptionally high quality, defect free compositions, and the cost of such procedures are high. Moreover, the processing conditions must be stringently maintained. As a consequence, there is a need for a relatively inexpensive, flexible processing technique for the production of ceramic and metallic composites.

Polymers are widely used in conjunction with inorganic powders in the paint, structural ceramics, and electronic ceramics industries. Precipitation of polymer solutions by varying the solvent quality has been reported in the scientific literature, but the precipitation of polymer solutions in the presence of inorganic particulate matter other than silica remains unexplored. "Coacervation", or the separation of an initially homogeneous polymer solution into a two-phase mixture, one phase of which is nearly pure solvent, has been induced in poly(vinyl alcohol) (PVA) by the adsorption of PVA onto silica, as reported by R. K. Iler in *J. Colloid Interface Sci.*, 51, 388 (1975). The hydrophilic surface sites on the silica bond to the hydrophilic moieties of the PVA, the hydrophobic moieties are then exposed to the solvent, and phase separation results.

The process of Iler brings about phase separation by changing the character of the polymer exposed to the solvent at the powder-solvent interface, not by changing the character of the solvent that the polymer is exposed to. The product of Iler's process is an oily material made using monolayer coverage of powder particles with PVA, with no obvious commercial applications or potential, which cannot be readily consolidated and fired to ceramic bodies.

It is therefore an object of the present invention to provide a technique for producing ceramic and metallic composites which yields an extremely uniform, high quality composition.

It is another object of the present invention to provide a technique for producing ceramic and metallic composites which is relatively economical and allows for less stringent processing conditions than with presently available techniques.

It is a further object of the present invention to provide a technique using inexpensive or recyclable solvents for forming ceramic and metallic composites.

SUMMARY OF THE INVENTION

Precipitation of dilute polymer aqueous or non-aqueous solutions in which ceramic and/or metallic powders are dispersed is used to produce high strength, extremely uniform, macroscopically defect free composite ceramic bodies having excellent properties.

BRIEF DESCRIPTION OF THE DRAWINGS

FIG. 1b is a plot of the fracture strength vs. probability of failure for the billets of FIG. 1a.

DETAILED DESCRIPTION OF THE INVENTION

Figure 1A:
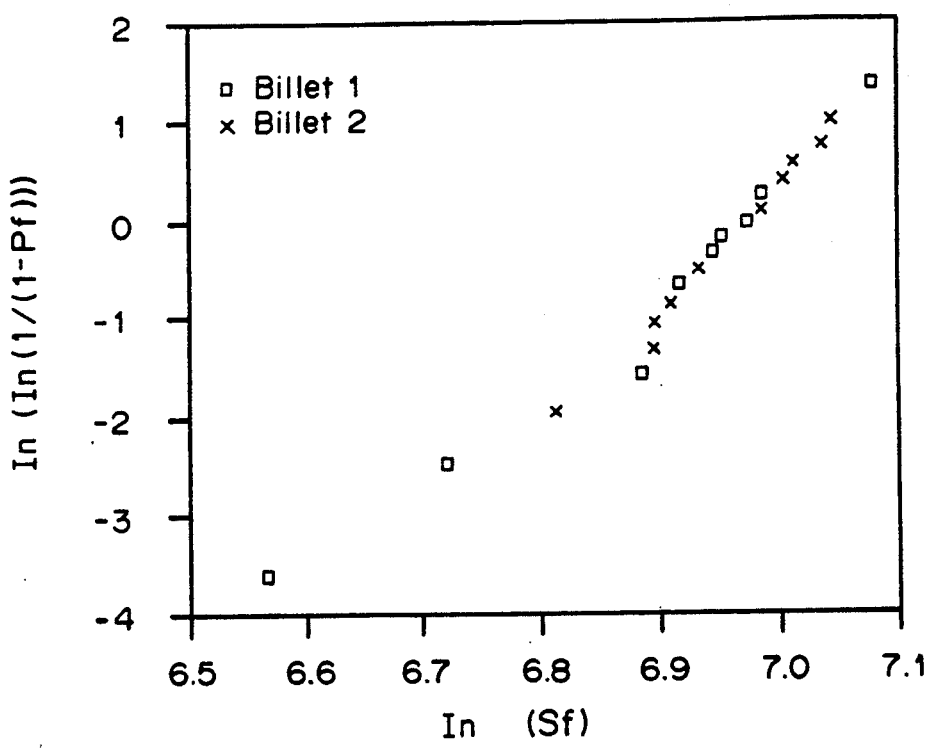
FIG. 1a is a Weibull plot of fracture strength for two billets of an alumina-zirconia composite (approximately 14 weight % zirconia) processed according to the present invention.

The present invention is a method for making highly uniform ceramic and metallic composites and is summarized as follows:

an appropriate two component solvent system is selected;

the ceramic and/or metallic powders to be utilized are selected;

a polymer which is capable of binding the ceramic and metallic particles in the solvent system is selected, wherein the polymer is soluble in one component of the solvent system and insoluble when the second component is added;

the ceramic and/or metallic powders are uniformly disperse, using a method such as ultrasound, in a solution made by dissolving the polymer in the first component of the solvent system;

the second solvent component is added to the uniform powder dispersion, causing the powder particles and polymer to precipitate as a flocculated second phase; and the precipitated particles, containing the original powder particles and polymer, are processed using techniques known to those skilled in the art to produce high quality, defect-free, extremely uniform compositions.

The selection of the two component solvent system is important, along with the selection of an appropriate polymer which acts to bind the ceramic or metallic particles in the solvent system. The ceramic or metallic particles are sized such that they remain dispersed in the solvent system at least until the addition of the second solvent. The key to the technique is that the polymer is soluble in one component and precipitated by the addition of the second component. The result is a precipitated second phase containing a uniform mixture of the particles.

A number of aqueous and non-aqueous solvent systems can be utilized, such as the water-acetone system or toluene-hexane system used in the following examples. In the preferred system, the polymer is dissolved in an acidified aqueous solution to electrostatically stabilize the dispersed ceramic or metallic particles.

The polymer can be organic, such as poly(vinyl alcohol) or poly(methyl methacrylate), or inorganic. Examples of useful polymers with backbones not exclusively of carbon include polysilanes, polysilazanes, polycartosilanes, and partially reacted, polymerized alkoxides. Block copolymers (having soluble and insoluble components) may also be desirable since the component which is insoluble in the first solvent could strongly absorb to the particle surface and the soluble component could remain in solution, sterically stabilizing the dispersed particles. The polymer must be able to bind the particles when the two components of the solvent system are mixed. It may also be a requirement that it can be removed from the final product, as, by example, by binder burnout. Additional components such as polyethylene glycol (PEG), or other "plasticizers", can be added to the polymer solution. The polymer may be tailored for use with the particles to be precipitated. The exact mechanism is not important to the process, although polymer attached to particle surfaces may be acting to bridge the particles being precipitated or a polymer network may hold the particles without attaching to them, much as a plastic mesh bag will hold grapefruits.

The ceramic particles which are useful in the present invention are commercially available. The preferred particle size is generally in the range of 0.1 micron to 1 micron in diameter, although larger particles may be utilized. Metal powders can also be used, preferably in the size range of up to 5 to 10 microns. Useful metallic, intermetallic and ceramic powders include Al, Cu, Nb, Mo, Ti, $Ni_3Al$, $Al_2O_3$, $ZrO_2$, $TiO_2$, $SiO_2$ and $Y_2O_3$. The primary criteria in sizing the particles are the desired properties of the processed product and the requirement that the particles remain dispersed and suspended in the solvent system during the precipitation.

The ceramic or metallic particles are preferably added to a relatively dilute concentration. The limiting concentration is that concentration at which the particles can no longer be effectively dispersed. The particles are added up to a concentration of approximately 10 weight percent, or 2% by volume, in the following examples. It would be relatively straightforward to increase the concentration.

The polymer is preferably added to the first solvent component in a ratio of 1:30 to 1:20 to the particles to be precipitated. Adding the second solvent component to the dispersion of powder particles in the first solvent component produces flocs of powder particles and polymer that precipitate out of solution. It is preferable to keep polymer and powder concentration sufficiently low so that non-solvent can easily and thoroughly be mixed into the system. If there is too little polymer added, the precipitate is runny and unprocessable using the available technology. If too much polymer is added, the precipitate is too rubbery.

The precipitate is processed using techniques known to those skilled in the art, such as compacting, drying, and heat treating. Techniques known to those skilled in the art on compacting or filter pressing are described by F. H. Norton in "Clay-Water Pastes" in *Ceramic Fabrication Processes*, Chapter 10, p. 85 edited by W. D. Kingery (Massachusetts Institute of Technology Press, Cambridge, Mass., 1958) and by J. T. Jones and M. F. Berard in *Ceramics: Industrial Processing and Testing*, p. 35, 37, 41 (Iowa State University Press, Ames, Iowa, 1972). The end product is characterized by an extremely homogeneous composition and appears to be amenable to heat treatment using a variety of processing schedules.

EXAMPLE 1

Precipitation of Alumina and Zirconia in an Aqueous-PVA Solution

An aqueous solution (400 ml) containing 0.5 wt % of 14,000 mw PVA (Aldrich Chemical Co., Inc., Milwaukee, Wis.) was filtered (10 to 20 micron glass frit) and adjusted to between pH 2 and pH 3 with eight drops (approximately 0.3 ml) of concentrated nitric acid. Sumitomo AKP-HP alumina powder (Sumitomo Chemical America, Inc., New York, N.Y.) (32g) and Toyo Soda TZ-0 zirconia powder (Toyo Soda USA, Atlanta, Ga.) (8 g) were added to the solution, which was then ultrasonically agitated using a Heat Systems-Ultrasonics, Inc., Farmingdale, N.Y., ultrasonic agitator at high power (20 kHz, 100W, 8 min). This resulted in a dispersion that was stable against flocculation over a period of weeks, but that sedimented slowly. The dispersion was allowed to gravitationally settle for 24 h, and 300 ml of supernatant was carefully removed using a cannulation procedure, leaving large powder agglomerates behind. The supernatant was then mechanically mixed to eliminate stratification due to gravitational settling.

Powder agglomerates are collections of powder particles that do not have the ability to move independently of each other. They may be attached by chemical bonds between particles, or by Van der Waals forces between particles. They are undesirable for composite formation, as they will lead to inhomogeneity of second phase distribution in finished ceramic parts. Present research has shown that agglomerate removal leads to great improvements in the mechanical properties of the finished ceramics.

The well-mixed dispersion was precipitated with 375 ml of filtered (10 to 20 micron glass frit) acetone. The resulting floc-solvent mixture was poured onto a 100 mesh screen and allowed to drain for five minutes.

The wet paste was consolidated in a fritted press at a pressure of 35 MPa for ½ h. After the specimen was ejected from the press it was air dried at 60° C. The resulting green body was cold isostatically pressed in a neoprene bag at 300 MPa for one minute. The PVA was burned out in air by ramping the temperature at 2° C./min to 600° C., and the sample was bisque fired in air for ½ h at 1200° C. It was then vacuum fired for 2 h at 1500° C.

Two samples were made using the procedure described above. The fired bodies were machined into 1.5 mm×2.0 mm×25.0 mm bend bars. The bars were then tested in four point bending (inner span of 10 mm, outer span of 20 mm) at a crosshead displacement rate of 0.01 in/min.

Figure 1B:
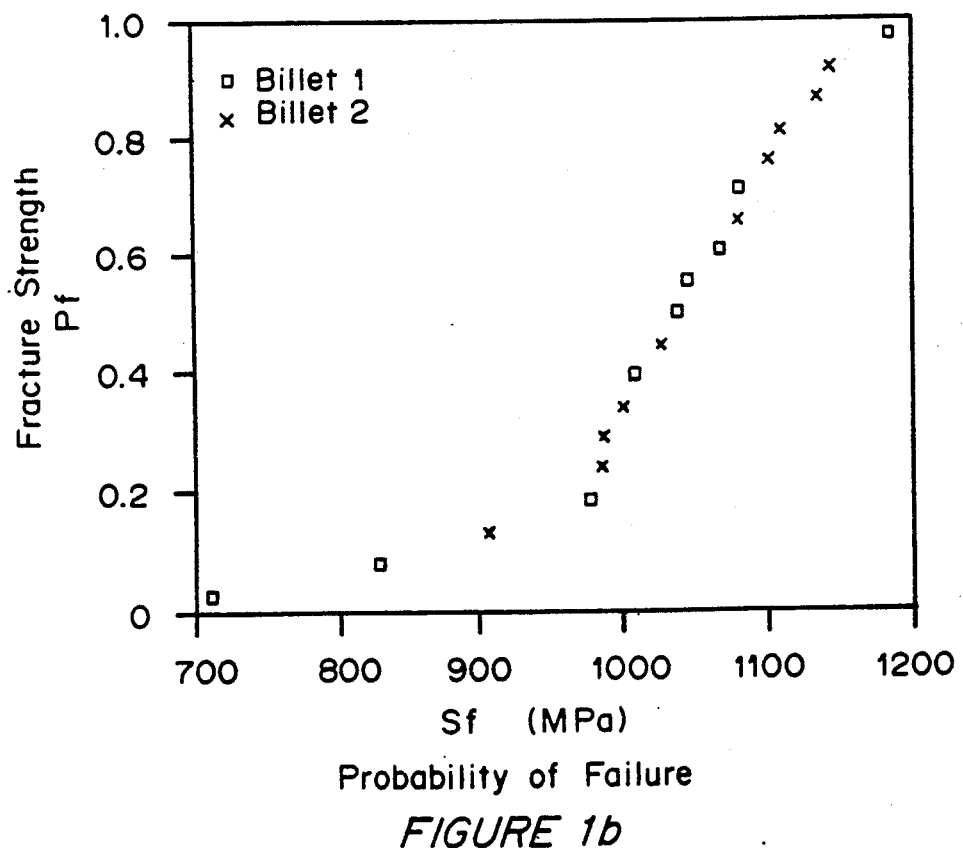

FIGS. 1a and 1b show a Weibull plot and a fracture vs. failure probability plot for the combined results of two billets. The average fracture stress is 1022 MPa with a Weibull modulus of 10.1, and the interbillet repeatability is excellent. Weibull statistics are described by W. E. C. Creyke, I. E. J. Sainsbury and R. Morrell in *Design with Non-Ductile Materials*, p. 68-101 (Applied Science Publishers, London, 1982).

Figure 2:
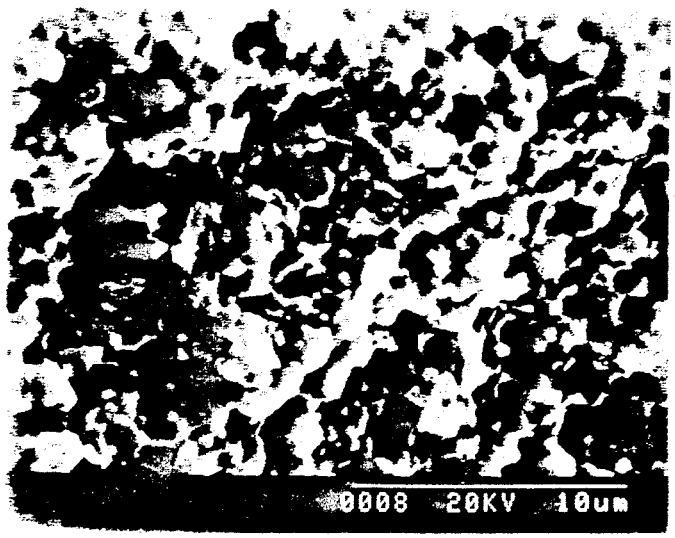
FIG. 2 is a scanning electron fractograph of an alumina-zirconia (approximately 14 wt % zirconia) bend bar processed according to the present invention.

FIG. 2 shows a scanning electron fractograph of one of the broken bend bars, demonstrating the fine-grained alumina matrix with very fine zirconia particles at the grain corners.

Figure 3:
FIG. 3 is a scanning electron micrograph of a polished section of an alumina-zirconia composite (approximately 14 wt % zirconia) processed according to the present invention.

FIG. 3, a scanning electron micrograph of a polished surface of this material, shows a void-free microstructure with the zirconia phase uniformly distributed.

EXAMPLE 2

Precipitation of Alumina and Zirconia in a Non-Aqueous PMMA-Solution 400 ml of a 0.5 wt % solution of 93,300 mw poly(methyl methacrylate) (PMMA) (Aldrich) in toluene was prepared. Alumina and zirconia powder were added as in example 1, and the slurries ultrasonically agitated at high power.

Hexane (600 ml) was added to precipitate the polymer-containing dispersion. The resulting flocs were processed as in the aqueous systems. After firing, the sample had a fine-grained microstructure with a uniform distribution of zirconia particles.

Although the process of making very uniform ceramic and metal composites has been described with reference to specific embodiments, variations and modifications will be apparent to those skilled in the art. Such modifications and variations are intended to come within the scope of the appended claims.

I claim:

1. A process for making extremely uniform compositions from ceramic or metallic particles comprising:
   selecting a first solvent and a polymer wherein said polymer is soluble in said first solvent;
   selecting a second solvent, wherein said first solvent and said second solvent are miscible and said polymer is insoluble in the mixture of said first solvent and said second solvent;
   dispersing particles in a solution of said polymer and said first solvent, wherein said particles are selected from the group consisting of ceramic particles, metallic particles, and combinations thereof and are small enough to be suspended in the polymer-solvent solution; and
   adding said second solvent to said polymer-solvent solution to co-precipitate the dispersed particles and polymer as a highly agglomerated, gel mass immobilizing the particles, wherein the gel-like mass has a diameter of greater than or equal to one centimeter.

2. The method of claim 1 further comprising adjusting the pH of said polymer solvent solution.

3. The method of claim 1 wherein said polymer is a co-polymer including polymer segments insoluble in said first solvent.

4. The method of claim 1 wherein the polymer is selected from the group consisting of poly(vinyl alcohol), poly(methyl methacrylate), polysilanes, polysilazanes, polycarbosilanes, partially reacted polymerized alkoxides, and combinations thereof.

5. The method of claim 1 further comprising selecting said particles from the group of ceramic powders and metal powders consisting of $Al_2O_3$, $ZrO_2$, $TiO_2$, $SiO_2$ and $Y_2O_3$, Al, Cu, Nb, Mo, Ti, $Ni_3Al$, and combinations thereof.

6. The method of claim 1 further comprising sizing said particles to have diameters of less than 15 microns.

7. The method of claim 1 wherein the particles are added to a concentration of up to about 10 weight percent.

8. The method of claim 1 further comprising agglomerates formed by precipitation of the polymer-particles.

9. The method of claim 1 further comprising evaporating said first and second solvents from the precipitated polymer-particles.

10. The method of claim 1 further comprising burning out the polymer from the precipitated polymer-particles.

11. The method of claim 1 further comprising heat treating said precipitated polymer-particles.

12. A uniform composition comprising ceramic particles, metallic particles, or combinations thereof, formed by precipitating a dispersed suspension of the particles in a solution of polymer in a first solvent by adding a second solvent, wherein said polymer is insoluble when said second solvent is added to said polymer solution, and the dispersed particles and polymer co-precipitate as a highly agglomerated, gel mass immobilizing the particles, wherein the gel-like mass has a diameter of greater than or equal to one centimeter.

13. The composition of claim 12 wherein said particles are selected from the group consisting of $Al_2O_3$, $ZrO_2$, $TiO_2$, $SiO_2$ and $Y_2O_3$, Al, Cu, Nb, Mo, Ti, $Ni_3Al$, and combinations thereof.

14. The composition of claim 12 wherein said particles have a diameter of less than about 15 microns.

15. The composition of claim 12 wherein said polymer is an organic binder.

16. The composition of claim 12 wherein said polymer is selected from the group consisting of poly(vinyl alcohol), poly(methyl methacrylate), polysilanes, polysilazanes, polycarbosilanes, partially reacted, polymerized alkoxides, and combinations thereof.

* * * * *